(12) United States Patent
Buzzetti

(10) Patent No.: US 6,926,765 B2
(45) Date of Patent: Aug. 9, 2005

(54) PSEUDOPLASTIC WATER BASED INK FOR BALL POINT PEN

(75) Inventor: Massimiliano Buzzetti, Turin (IT)

(73) Assignee: Reinol S.p.A., Turin (IT)

( * ) Notice: Subject to any disclaimer, the term of this patent is extended or adjusted under 35 U.S.C. 154(b) by 0 days.

(21) Appl. No.: 10/814,153

(22) Filed: Apr. 1, 2004

(65) Prior Publication Data

US 2004/0259977 A1 Dec. 23, 2004

(30) Foreign Application Priority Data

Apr. 2, 2003 (EP) .............................. 03425205

(51) Int. Cl.⁷ .......................... C09D 11/16; C09D 11/18
(52) U.S. Cl. ............... 106/31.27; 106/31.6; 106/31.37; 106/31.4; 106/31.69; 106/31.72
(58) Field of Search .................. 106/31.27, 31.6, 106/31.37, 31.4, 31.69, 31.72

(56) References Cited

U.S. PATENT DOCUMENTS

| | | | |
|---|---|---|---|
| 4,726,845 A | * | 2/1988 | Thompson et al. ...... 106/31.68 |
| 5,712,328 A | * | 1/1998 | Inoue et al. ................. 523/161 |
| 6,261,351 B1 | * | 7/2001 | Miyamoto et al. ........ 106/31.36 |
| 6,261,352 B1 | * | 7/2001 | Asami ...................... 106/31.58 |
| 6,500,247 B1 | | 12/2002 | Tzikas et al. |
| 6,666,913 B2 | * | 12/2003 | Hirano et al. ............... 106/31.9 |
| 2002/0007764 A1 | | 1/2002 | Takeuchi et al. |

FOREIGN PATENT DOCUMENTS

| | | |
|---|---|---|
| EP | 0 339 712 A | 11/1989 |
| EP | 1 035 134 A | 9/2000 |
| WO | WO 02/102905 A | 12/2002 |

* cited by examiner

Primary Examiner—J. A. Lorengo
Assistant Examiner—Veronica F. Faison
(74) Attorney, Agent, or Firm—Sughrue Mion, PLLC

(57) ABSTRACT

A pseudoplastic water based ink for a ball-point pen comprising at least a colorant, water and an associative type viscosity control system, whereby the viscosity of the ink is comprised in a range from 20 to 40 mPa.s, when it is subjected to a shear rate of 1000 $s^{-1}$, and between 10,000 and 12,000 mPa.s, when the shear rate is 1 $s^{-1}$.

8 Claims, No Drawings

PSEUDOPLASTIC WATER BASED INK FOR BALL POINT PEN

BACKGROUND OF THE INVENTION

The present invention is related a water based ink for ball-point pen (bpp). This expression indicates a writing instrument including structural components, such as a body retaining an ink reservoir, as well as means for delivering the ink to a socket located at one end of the instrument, and a routable point retained in the socket, suitable to apply the ink delivered to the socket to a surface, providing visible markings on the same surface. Only the portion of ink required is fed to the ball from the ink's reservoir.

A water based ink has a low viscosity, and is generally fed making use of the principle of capillarity. In particular, a conventional ball-point pen for water based inks has an absorbent fibrous ink reservoir and its ink, having a viscosity comprised between 3 and 5 mPa.s, is fed to the pen body through an absorbent feeding rod.

Undesirable variations in thickness of writing take frequently place. Also, it is difficult to know the amount of ink left in the pen. The holding capacity is in any case small. Moreover, the continuity of the ink column, in the pen body may be broken by solvent evaporation from the ball-point. Thus many bpp for water-based inks include a cap member to seal the ball-point and the tip, in order to control evaporation of volatile components of the ink and leakage of air around the ball into the ink reservoir, which may cause formation of gas bubble which can cause breakage of contact between the column of ink and the ball, with interruption of writing.

Rheologic properties are critical in the ink performance, because they can exert a direct influence on ink properties and on writing quality. Thus, in recent years water based inks, which have a pseudoplastic behaviour due to the addition of suitable substances, were produced.

During writing pseudoplastic inks have a reduced viscosity, because a shear force is applied to the ink, due to the rotation of the ball at the tip point. On the contrary, the same inks have a high viscosity when they are not subjected to shear forces, so as they do not flow from the relative pen when not in use.

The ball-point pens using this pseudoplastic water based ink can store it directly into the ink reservoir, without absorbing sector, and that simplify its structure. Moreover, the use of transparent materials makes possible to check the remaining amount of ink in the ink reservoir.

However ordinary thickening agents with pseudoplastic behaviour employed in inks' composition could not give, up to now, completely satisfactory results.

For example, Hydroxy Ethyl-Cellulose (HEC) can give to the ink a viscosity that may reach even 100 mPa.s at a shear rate of 30 $s^{-1}$, and maximum values of about 100 mPa.s at the shear rate produced by writing, which is of the order of 1000 $s^{-1}$. This is not satisfactory since these values (which are index of a pseudo-newtonian behaviour) bring about poor ink's flow in fast writing, and, on the contrary, exceeding flow, with ink dripping, when the pen is not in use. Moreover, this fact causes a capillary absorption of ink on the paper during writing pauses.

When only pseudoplastic additives are used, such as polyacrilic acid salts, cross linking type acrylic acid polymers, salts of styrene-acrylic acid copolymer, salts of styrene-maleic acid copolymer, non ionic polymers such as polyvinylpirrolodone and polyethylene glycol, or only polysaccharides such as xantan gum, alginic acid, the ink containing these viscosity controlling agents has a viscosity falling to 100 mPa.s, when the shear rate is 3,84 $s^{-1}$. That is not satisfying again because, when the pen does not work, the ink tends to drip, especially at temperatures over 30° C. or in particular barometric conditions (depressurisation).

Also when dextrins or maltodextrins are used as viscosity control agents, ink's viscosity may fall to about 100 mPa.s when the shear rate is 3,84 $s^{-1}$. That is not satisfying because, also in this case, the ink tends to drip, when the pen does not work.

SUMMARY OF THE INVENTION

The object of the present invention is to obtain a pseudoplastic ink having rheological properties more suitable to the employment needs, in comparison with the inks described by the known techniques, that is high viscosity at low shear rates, to stop ink's flow during writing pauses, and low viscosity at high shear rates, to ensure a suitable ink's feeding during fast writing.

According to the invention, this object is reached by means of a water based pseudoplastic ink for ball-point pen, comprising at least a colorant, water and an associative type viscosity control system, whereby the ink's viscosity is comprised between 20 and 40 mPa.s, when it is subjected to a shear rate of 1000 $s^{-1}$, and between 10,000 and 12,000 mPa.s, when subjected at a shear rate of 1 $s^{-1}$.

A critical element of the ink of the present invention is the viscosity control system, which is of "associative" type. These particular systems, indeed, forming a reduced number of filaments, whose length is minor in comparison with the traditional thickeners, allow a viscosity sudden collapse with the increase of the shear force, so they adjust in an optimal way the ink's downflow from the pen according to the writing speed.

Among the associative type viscosity system control components utilisable in the present invention, we can mention associative thickeners, and in particular hydrophobe modified cellulose (whose anglosaxon acronym is HASE), hydrophobe modified ethoxylate non ionic urethanes (whose anglosaxon acronym is HEUR), and their mixtures (whose anglosaxon acronym is HEURASE).

The primary thickening mechanisms for this category of thickeners has been described as hydrophobe interaction and ion-dipole interaction. The hydrophobe groups and substances in water solutions generally tend to cluster into aggregates, then generate solutions' thickening. Associative thickeners achieve a good thickening efficiency despite their low molecular weight since they provide viscosity by intermolecular association with other components existing in any ink's dispersed phase. Consequently, their molecular weights can be lower than those of the traditional thickeners.

Ink's preferred viscosity control systems of the present invention are the synergetic combination of an associative thickener chosen in the group consisting of HASE, HEUR and HEURASE and a second component chosen in the group consisting of acrylic resins, emulsifying oils, polysaccharides and their mixtures. For example, the associative thickener may be a Hydrophobic Modified Hydroxy Ethyl-Cellulose (whose anglosaxon acronym is HMHEC) and the second component may be a polysaccharide, as xantan gum, guar gum, alginic acid and their mixtures.

Other polysaccharides which can be employed in the ink of the present invention are dextrins or maltodextrins. These substances are indeed atoxic and safe, and show high solubility in water and a great hydro-retention without negative influence on the ink's remaining properties.

Without being bound by a particular theory, we can suppose that chemical interactions and bonds are produced between the associative thickener and the second component of the combination, generating an optimal sinergycal combination, in terms of thickening and lubrication effects.

By the presence of the viscosity associative control system, the ink of the invention has a non newtonian behaviour: in rest condition it is a viscous liquid, when shear force increases, it shows a collapse of viscosity, i.e. it becomes a fluid liquid at the shear rates generated by writing with a ball pen.

The rheologyc curve of the present invention's ink is thus pseudoplastic in a much more evident way, in comparison with conventional ink's curves. This fact allows amplifying the viscosity range useful by consequence of shear rate variations, generated during writing.

The pseudoplastic water based ink of this invention does not show any tendency to thickening, dripping and running from the pen point, so as a ball pen using this ink can write very smoothly and trace fine lines. At the same time, sedimentation of the substances contained in the ink is efficaciously prevented by the high viscosity of the same ink in rest conditions.

Moreover, such ink can be used for directly filling the pen's reservoir, without using a fibrous adsorber and an ink feeding rod in fibres. Such direct filling method results in an increased ink's holding capacity.

In addition, the pseudoplastic ink of this invention shows an higher time stability.

Moreover, the ink of the invention has the advantage that, when it contains a pigment having a large specific gravity, there can be obtained, with a shear rate range between 1 and $4 \text{ s}^{-1}$, an upper viscosity limit of about 12000 mPa.s, vs. the value of 4000 mPa.s obtainable with the inks of the prior art.

Preferably, the viscosity associative type control system is present in the ink of the invention in a percentage comprised between 5 and 25% and preferably between 10 and 20% on the total weight.

In the invention ink's compositions, all the additives normally used in this field, e.g. defoamers, wetting agents, dispersants and tensides may be moreover present.

We could mention among tensides non-ionic tensides and the fluorine based ones. The ink of the present invention contains tensides preferably in the range from 0.1 to 0.3% on the total weight.

As a solvent, beyond water, which is the main polar solvent, all solvents having polar groups which are miscible with water can be used; for example, ethylene glycol, propylene glycol, triethylene glycol, polyethylene glycol, ethylene glycol monomethyl ether, glycerine, pyrrolidone, triethanolamine, 1,3-propanediol, 1,3-butylene glycol, 1,4-butanediol, 1,3-propylene glycol, neopentyl glycol, ethylenic glycol and the like.

The ensemble of polar solvents employed may contain from about 50 to about 99% by weight of the whole composition of ink. Preferred compositions contain at least 70% by weight of water in the polar solvent system. Amounts of other polar solvents which may be included in the composition are between about 5 to about 20% by weight of the total weight of the entire solvent system. These solvents act as hygroscopic, moistening and wetting agents and are useful in reducing the ink drying rate.

The ink of the invention can also include preservatives to prevent the growth of micro-organisms, yeast and mould. E.g., such preservatives are based on methyl p-hydroxybenzoate, propyl-p-hydroxybenzoate, 1,2-benzoisothiazolinone and the like. These preservatives are typically present in amounts between about 0.01 to about 5% by weight of the entire ink composition.

The ink of the invention may include corrosion inhibitors, such as benzotriazole, to prevent corrosion phenomena of metals with which it may come in contact. Such inhibitors may constitute about 5% by weight of the ink composition, but are preferably used in amounts about 0.5% by weight.

The ink of the invention may contain lubricants for example unsaturated polyol esters (trimetylol-propane ester, pentaerythritol-tetraoleate, neopentyl-glycol ester) and poly-alcohol esters (glycerol monooleate, propylene-glycol dioleate) in the range preferably from 1 to 20% by weight on the total weight of the composition.

In the ink of the invention, all dyes and organic or inorganic pigments which can be dissolved or dispersed in water based solvents can be used.

Preferably, such dyes or pigments are contained in amounts from 0.1 to 20% by weight, based on the total weight of the composition.

Examples of dyes usable within the present invention are: acid dyes, such as Eosine, Floxine, Water Yellow 6-C, Brilliant blue FCF, Nigrosine NB; direct dyes such as Direct Black 154, Direct Blue 86, Direct Violet 99, Direct Sky Blue 5H and Violet BB; basic dyes such as Rhodamina and Methyl Violet; organic pigments such as Copper Phtalocyanine, Blue and Benzidine Yellow, EWLFTEX 5 MOGUL and REGAL 330R; all carbon blacks, HYDRA-COL X9220 and X9200; Fast Light Orange. These dyes can be used alone or in a mixture.

The inks of the invention can be prepared by combining the various ingredients in a microsphere stirrer until homogeneity is achieved.

Preferably, the associative viscosity control system is first added to distilled water and successively mixed for about two hours. Then, the other ingredients are added preferably in the following order: polar solvents, preservatives, tensides, corrosion inhibitor, pigments and dyes.

Further advantages and characteristics of the present invention will be evident with the following ink's compositions examples provided by way of non-limiting example, in which all the percentages are to be considered in weight, if not differently specified.

EXAMPLE 1

A blue water based pigment ink for a bpp has the following composition:

| | |
|---|---|
| Phthalocyanine blue | 8.0% |
| Styrene-acrylic resin emulsion | 15.0% |
| Poliphobe tr 114 (HEURASE) | 3% |
| Monopropyleneglycol (MPG) | 10% |
| Aminomethylpropanol | 3% |
| Acticide CHR9698 (preservative) | 0.2% |
| Ion exchanged water | balance |

The ink has the following rheologic properties:

viscosity at $1000 \text{ s}^{-1}$: 30 mPa.s viscosity $1 \text{ s}^{-1}$: 12,000 mPa.s

EXAMPLE 2

A blue water based pigment ink for a bpp has the following composition:

| | |
|---|---|
| Phtalocyanine blue | 8% |
| Emulsive oil | 20% |
| RHEOLATE* 1 (HEUR) | 3% |
| Monoethyleneamine (MEA) | 3% |
| MPG | 15% |
| Preventol D6 (preservative) | 0.1% |
| Ion exchanged water | balance |

The ink has the following rheologic properties:

viscosity at 1000 s$^{-1}$: 40 mPa.s viscosity at 1 s$^{-1}$: 10,000 mPa.s

EXAMPLE 3

A black water based pigment ink for a bpp has the following composition:

| | |
|---|---|
| Dye | 4.0% |
| Styrene-acrylic resin | 3.0% |
| HMHEC (Natrosol plus) | 4.0% |
| MPG | 15% |
| Preventol D6 (preservative) | 0.1% |
| Ion exchanged water | balance |

The ink has the following rheologic properties:

viscosity at 1000 s$^{-1}$: 30 mPa.s viscosity at 1 s$^{-1}$: 11,000 mPa.s

EXAMPLE 4

A blue, pseudoplastic water based dye ink for a bpp has the following composition:

| | |
|---|---|
| Dye | 5.0% |
| HEUR | 3.0% |
| Acrylic resin emulsion | 10% |
| MPG | 15% |
| Preventol D6 (preservative) | 0.1% |
| Polyvinylpirrolidone | 5% |
| Ion exchanged water | balance |

The ink has the following rheologic properties:

viscosity at 1000 s$^{-1}$: 40 mPa.s viscosity at 1 s$^{-1}$: 11,500 mPa.s

Naturally, with the principle of the invention remaining unchanged, the details of production and the embodiments may of course vary widely with respect to what has been described purely by way of example, without thereby departing from the scope thereof.

What is claimed is:

1. A pseudoplastic water based ink for a ball-point pen comprising at least a colorant, water and an associative type viscosity control system, whereby the viscosity of the ink is comprised in a range from 20 to 40 mPa.s, when it is subjected to a shear rate of 1000 s$^{-1}$, and between 10,000 and 12,000 mPa.s, when the shear rate is 1 s$^{-1}$.

2. An ink according to claim 1, in which said associative viscosity control system is a synergetic combination of an associative thickener, selected from the group consisting of hydrophobe modified cellulose (HASE), hydrophobe modified ethoxylate non ionic urethanes (HEUR), and mixtures thereof (HEURASE), and a second component, selected from the group consisting of acrylic resins, emulsifying oils, polysaccharides and mixtures thereof.

3. An ink according to claim 2, in which said associative thickener is a hydrophobe modified hydroxyethylcellulose (HMHEC).

4. An ink according to claim 2, wherein said second component is a polysaccharide selected from the group consisting of xanthan gum, guar gum, alginic acid and mixtures thereof.

5. An ink according to claim 3, wherein said second component is a polysaccharide selected from the group consisting of xanthan gum, guar gum, alginic acid and mixtures thereof.

6. An ink according to claim 1, further comprising a tenside agent.

7. An ink according to claim 1, in which said associative viscosity control system is contained in a quantity comprised between 5 to 25% of the total weight.

8. An ink according to claim 7, in which said associative viscosity control system is contained in a quantity comprised between 10 and 20% of the total weight.

* * * * *